(12) United States Patent
Richter

(10) Patent No.: US 11,951,669 B2
(45) Date of Patent: Apr. 9, 2024

(54) METHOD AND MACHINE FOR PRODUCING A SINGLE-WALLED OR MULTI-WALLED TUBULAR THERMOPLASTIC BODY

(71) Applicant: Bodo Richter, Altenkirchen (DE)

(72) Inventor: Günter Richter, Bad Honnef (DE)

(73) Assignee: Bodo Richter (DE)

( * ) Notice: Subject to any disclaimer, the term of this patent is extended or adjusted under 35 U.S.C. 154(b) by 682 days.

(21) Appl. No.: 16/980,784

(22) PCT Filed: Mar. 7, 2019

(86) PCT No.: PCT/EP2019/055673
§ 371 (c)(1),
(2) Date: Sep. 14, 2020

(87) PCT Pub. No.: WO2019/179778
PCT Pub. Date: Sep. 26, 2019

(65) Prior Publication Data
US 2021/0001533 A1   Jan. 7, 2021

(30) Foreign Application Priority Data

Mar. 19, 2018   (DE) ............... 10 2018 106 319.9

(51) Int. Cl.
*B29C 48/17*   (2019.01)
*B29C 48/00*   (2019.01)
(Continued)

(52) U.S. Cl.
CPC ...... *B29C 49/4247* (2013.01); *B29C 48/0017* (2019.02); *B29C 48/0018* (2019.02);
(Continued)

(58) Field of Classification Search
CPC ............................................. B29C 48/0018
See application file for complete search history.

(56) References Cited

U.S. PATENT DOCUMENTS

| 4,929,410 A * | 5/1990 | Meyer | B29C 49/50 264/533 |
| 8,911,660 B2 * | 12/2014 | Visscher | B29C 48/91 264/565 |

(Continued)

FOREIGN PATENT DOCUMENTS

| JP | S5718219 A | 1/1982 |
| JP | H0664025 A | 3/1994 |

OTHER PUBLICATIONS

Suzuki JPS5718219 English Translation 1982 (Year: 1982).*
(Continued)

*Primary Examiner* — Jacob T Minskey
*Assistant Examiner* — Adrien J Bernard
(74) *Attorney, Agent, or Firm* — McGarry Bair PC

(57) ABSTRACT

In a method for producing at least a single-walled tubular thermoplastic body in a machine, a nozzle head extrudes at least one tubular preform. The preform is expanded to a predefined dimension in a transverse direction and to a predefined shape in an expansion process using an expanding mandrel, the preform remaining open at the top and bottom. When the at least one preform has cooled off, the expanding mandrel is changed into a non-expanded state and the at least single-walled tubular body is removed from the machine.

15 Claims, 15 Drawing Sheets

(51) Int. Cl.
*B29C 48/09* (2019.01)
*B29C 48/88* (2019.01)
*B29C 49/22* (2006.01)
*B29C 49/42* (2006.01)
*B29C 55/24* (2006.01)
*B29C 49/04* (2006.01)
*B29L 23/18* (2006.01)

(52) U.S. Cl.
CPC .......... *B29C 48/09* (2019.02); *B29C 48/9115* (2019.02); *B29C 49/22* (2013.01); *B29C 55/24* (2013.01); *B29C 49/04104* (2022.05); *B29C 2791/001* (2013.01); *B29C 2791/006* (2013.01); *B29C 2949/08* (2022.05); *B29L 2023/186* (2013.01)

(56) References Cited

U.S. PATENT DOCUMENTS

| 2008/0033367 | A1* | 2/2008 | Haury | A61M 5/3129 |
| | | | | 604/187 |
| 2012/0280432 | A1* | 11/2012 | Chen | B29C 49/4273 |
| | | | | 264/400 |
| 2014/0265052 | A1* | 9/2014 | Majima | B29C 49/20 |
| | | | | 264/516 |

OTHER PUBLICATIONS

The International Bureau of WIPO, Written Opinion of The International Searching Authority re Corresponding Application No. PCT/EP2019/055673, dated Sep. 22, 2020, 10 pages, Switzerland.

* cited by examiner

METHOD AND MACHINE FOR PRODUCING A SINGLE-WALLED OR MULTI-WALLED TUBULAR THERMOPLASTIC BODY

CROSS-REFERENCE TO RELATED APPLICATIONS

This application is a National Phase application of International Application No. PCT/EP2019/055673, filed Mar. 7, 2019, which claims the benefit of German Application 10 2018 106 319.9, filed on Mar. 19, 2018, both of which are incorporated herein in their entireties.

TECHNICAL FIELD

The invention relates to a method for producing a single-walled or multi-walled tubular thermoplastic body. Further, the invention relates to a machine for producing such tubular bodies.

BACKGROUND

In the prior art, large-dimensioned molded parts, such as tube segments, are produced in tube extrusion machines or according to the extrusion winding method. The associated machines are extremely complex and expensive in the case of tube diameters >1500 mm. Tube segments or tube bodies are inter alia required for producing storage tanks. In accordance with the desired tank volume, the tube bodies are produced in different lengths and welded together. For increasing the ring stiffness, preferably single-walled or double-walled corrugated tube bodies are used. In particular, the economy requires double-walled corrugated tube bodies with a smooth inner wall, since, compared to single-walled corrugated tube bodies, these corrugated tube bodies have the advantage of an easier cleaning and emptying.

In the prior art, moreover the production of large tube segments in blow molding machines is known. In such a machine, closed hollow bodies having a diameter of 2000 mm and more may be produced. The disadvantage here is that a hollow body produced in this way may only be produced completely closed, which means that for producing tube segments, the two bottoms at the top and bottom have to be separated from the hollow body and thus are waste. This waste may amount to 40% and more of the actual hollow body. In addition, there is the so-called flash portion, which inevitably occurs during the blow molding process, which results altogether in a waste of 50% and more. If, for example, a tubular body produced according to the blow molding method has a desired weight of 50 kg plastic material, then the shot weight, i.e. the plastic material to be extruded, must amount to more than 100 kg, which is highly uneconomical. A further disadvantage is also the limited length of the tubular body produced in a blow molding machine due to machine conditions. In addition, tubular bodies produced by blow molding may only be produced with a single wall.

BRIEF DESCRIPTION

It is the object of the invention to specify a method and a machine for producing a tubular body from thermoplastic material, with which the large volume tubular body may be produced economically and with little plastic waste.

This object is solved by a method for producing an at least single-walled tubular body from thermoplastic material in a machine, in which at least one tubular preform is output from the nozzle head of an extrusion device, the preform is guided vertically downwards, the preform is expanded in an expansion process by an expanding mandrel arranged centrically to the nozzle head to a predefined dimension in a transverse direction and to a predefined shape, wherein the preform remains open at the top and bottom, the expanding mandrel is changed into a non-expanded state after cooling the at least one preform, and in which afterwards the at least single-walled tubular body is removed from the machine.

In the invention, the preferably cylindrical preform surrounds the expanding mandrel after the extrusion, and it is separated near to the nozzle head in accordance with the desired length. The extrusion device may for example be constructed like in a conventional blow molding machine for hollow bodies having a large diameter. The expanding mandrel expands the preform in its still warm state to the desired diameter. In the case of a single-walled tubular body, the cooling takes place in this expanded state, after which the expanding mandrel is changed into the non-expanded state. For producing a double-walled tubular body, after expanding the first preform, the expanding mandrel is changed into the non-expanded state, and then a second preform is extruded. The expanding mandrel is then expanded once again so that the second preform comes into contact with the still warm first preform and they weld together. Then, the two preforms are cooled off and the finished tubular body is removed from the machine.

In the method mentioned, almost the entire extruded plastic material is utilized and no plastic waste is produced. The method operates comparatively fast and thus has a high efficiency, in particular when considering the reduced waste. Moreover, the method has a high flexibility of use, since it is easy to produce tubular bodies with different lengths.

According to a preferred embodiment, the expanding mandrel comprises a first partial mandrel and a second partial mandrel, and during the expansion process, at first a pre-expansion by means of the first partial mandrel takes place, during which first expanding elements enlarge the inner space in the preform so far that in this inner space a space for the second partial mandrel is created, the second expanding elements of which expand the preform up to the predefined dimension and shape in a transverse direction. Accordingly, the first partial mandrel may have an elongated slimmer shape so that the tubular preform, mostly in cylindrical shape, may be extruded with a small diameter. By pre-expanding the preform to a larger diameter, then space for the second partial mandrel is created, the expanding elements of which then expand the preform up to the predefined dimension and to the predefined shape.

The method may be used for producing a single-walled corrugated tubular body, wherein at least a two-part hollow mold is arranged around the tubular preform. Upon expansion by means of the expanding device, the preform is pressed against a corrugated profile of the hollow mold and by applying a vacuum on the hollow mold and/or compressed air on the expanding mandrel, the still warm preform adopts the shape of the corrugated profile. Instead of a corrugated profile, also a cup profile may be used. The tubular body is then provided with cups.

In a preferred method for producing a double-walled corrugated tubular body, at first the expanding mandrel is moved into the retracted state after producing a single-walled corrugated tubular body. Afterwards, a further tubular preform is continuously output from the nozzle head, so that this one faces the still warm preform in the hollow mold with the corrugated profile. The expanding mandrel then expands the further preform and brings it into contact with the preform present in the hollow mold so that the further preform is welded to the preform present in the hollow mold at points of contact. Subsequently, both preforms are cooled off and removed from the machine. In this way, a tubular body with a smooth inner wall and a corrugated outer wall is produced. Such a tubular body has a high ring stability and may be emptied and cleaned easily. Here, too, instead of a corrugated profile a cup profile may be used. The welding then takes place at the contact points in a point-shaped or cup-shaped manner.

According to a further aspect of the invention, a machine which serves to produce an at least single-walled tubular body from thermoplastic material is specified. This machine results in the technical and economical advantages described in connection with the production method.

BRIEF DESCRIPTION OF THE DRAWINGS

Embodiments of the invention are explained in the following on the basis of drawings.

DETAILED DESCRIPTION

Figure 1:
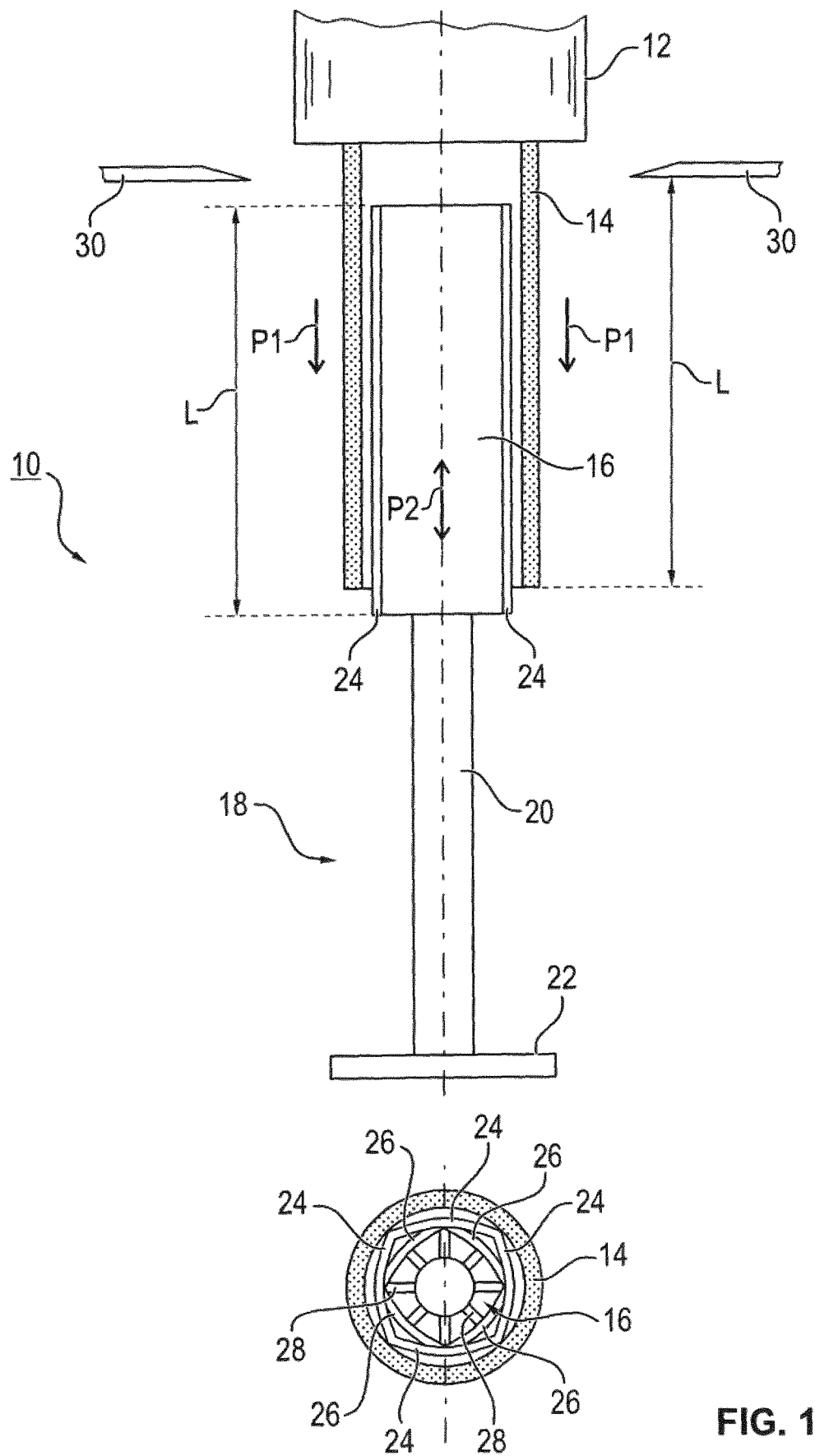
FIG. 1 shows a machine for producing a tubular body from thermoplastic material in a side view and a top view.

FIG. 1 shows parts of a machine 10 for producing a single-walled or multi-walled tubular body from thermoplastic material, for example from PE, PP or PVC. As can be seen in the side view, a tubular preform 14 is output from a nozzle head 12 of an extrusion device (not illustrated) over an expanding mandrel 16 of an expanding device generally identified with the reference sign 18, which expanding mandrel 16 is arranged centrically to the nozzle head 12. This expanding mandrel 16 is arranged movably in the direction of the double arrow P2 on a guiding element 20, which stands on a base plate 22. A hydraulic or electric drive (not illustrated) serves to move the expanding mandrel 16 up and down.

As can be taken from the top view illustrated at the bottom of FIG. 1, the expanding mandrel 16 comprises several expanding elements 24 and 26 (four expanding elements each are illustrated). These expanding elements 24, 26 are in the illustrated retracted state. By means of drives 28 (only two drives are identified), they can be extended and in doing so expand the preform 14. The drives 28 may, for example, be actuated hydraulically or electrically.

As mentioned above, the expanding mandrel 16 may be moved along the double arrow P2 upwards and downwards so that in the lower position a finished tubular body may be laterally removed from the machine 10. The expanding mandrel 16 may, in one embodiment, also be arranged firmly in the illustrated upper position, and is then not movable in the direction of the double arrow P2. For removing the finished tubular body upwards, then the nozzle head 12 is laterally moved away. This embodiment is not illustrated in FIG. 1.

Shortly before the preform 14 has its required length L during its movement downwards in the direction P1, which length corresponds to the length L of the expanding mandrel 16, a separating device 30 separates the preform from the nozzle head 12 so that this preform 14 faces the length of the expanding elements 24, 26. This process may also be supported by gripping elements (not illustrated), which support the preform 14 from outside. A supporting effect during this process may also be provided by the expanding mandrel 16 itself, in that the expanding elements 24, 26 start to expand so that these expanding elements 24, 26 come into contact with the preform 14 and specifically inhibit its downward movement.

The expanding elements 24, 26 are expanded by the drives 28 to the desired outer dimension for the single-walled finished tubular body. Afterwards, the expanded preform 14, which is held by the expanding elements 24, 26, is cooled off. The cooling of the preform 14 shaped into the tubular body may be supported by a cooling of the expanding elements 24, 26 and/or by a fan cooling from outside. Further, a vacuum may be applied to the expanding elements 24, 26 to keep the preform in close contact with the surface of the expanding elements 24, 26.

Figure 2:
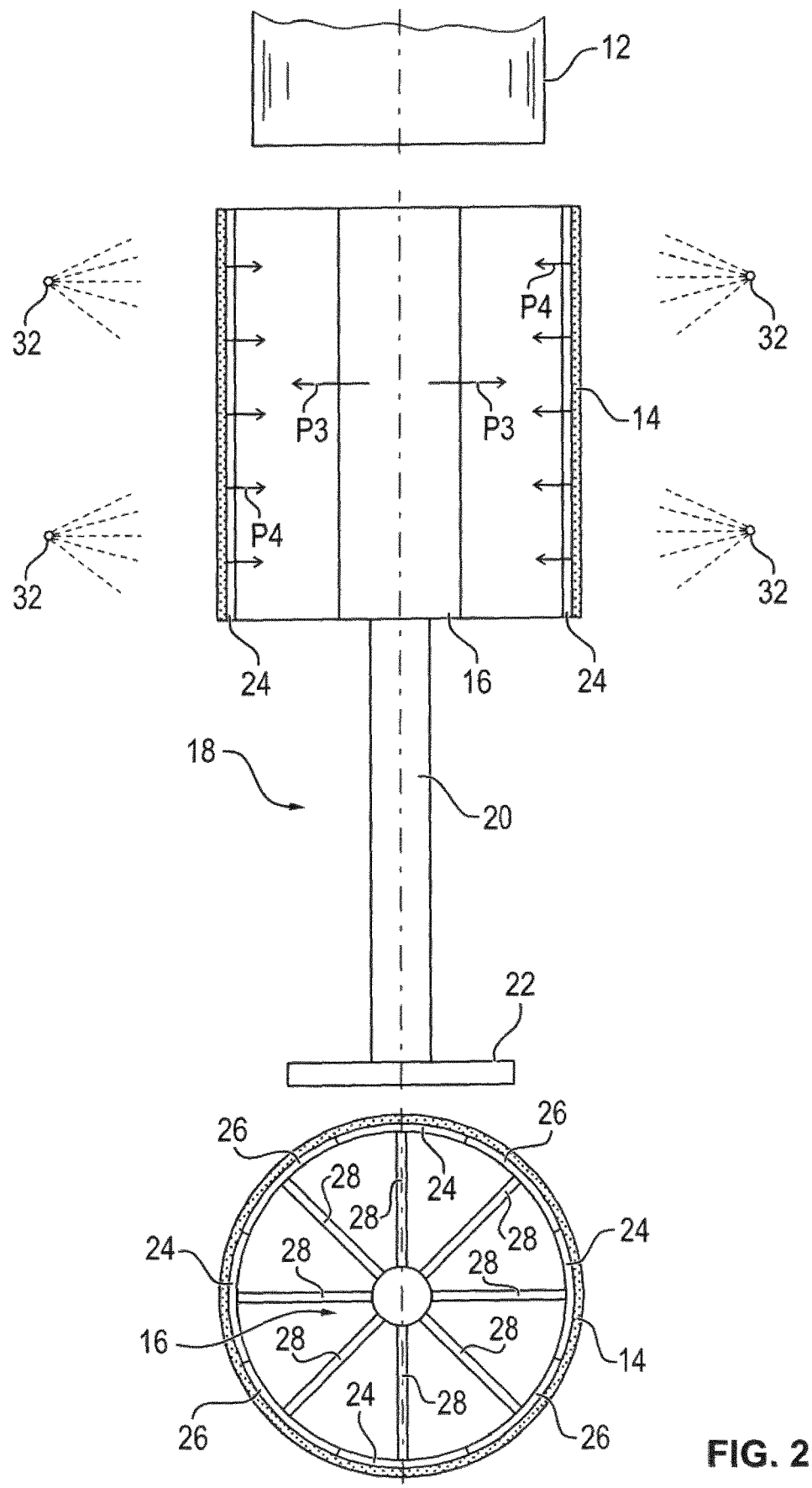
FIG. 2 shows the machine according to FIG. 1 in the state after the expansion process.

In a side view and a top view, FIG. 2 shows the state after the expansion process. Identical parts are identified with the same reference signs in the following. In the top view, it can be seen that the expanding elements 24, 26 are fully extended by the drives 28 and expand the preform 14, the preform reducing its wall thickness (see FIG. 1). The expansion takes place in the direction of the arrows P3. The arrows P4 indicate the vacuum which is applied to the expanding elements 24 and 26, respectively, and cause the close contact to the preform 14. In this way, the cooling-off speed is increased. A cooling from outside takes place with the aid of fans 32.

Figure 3:
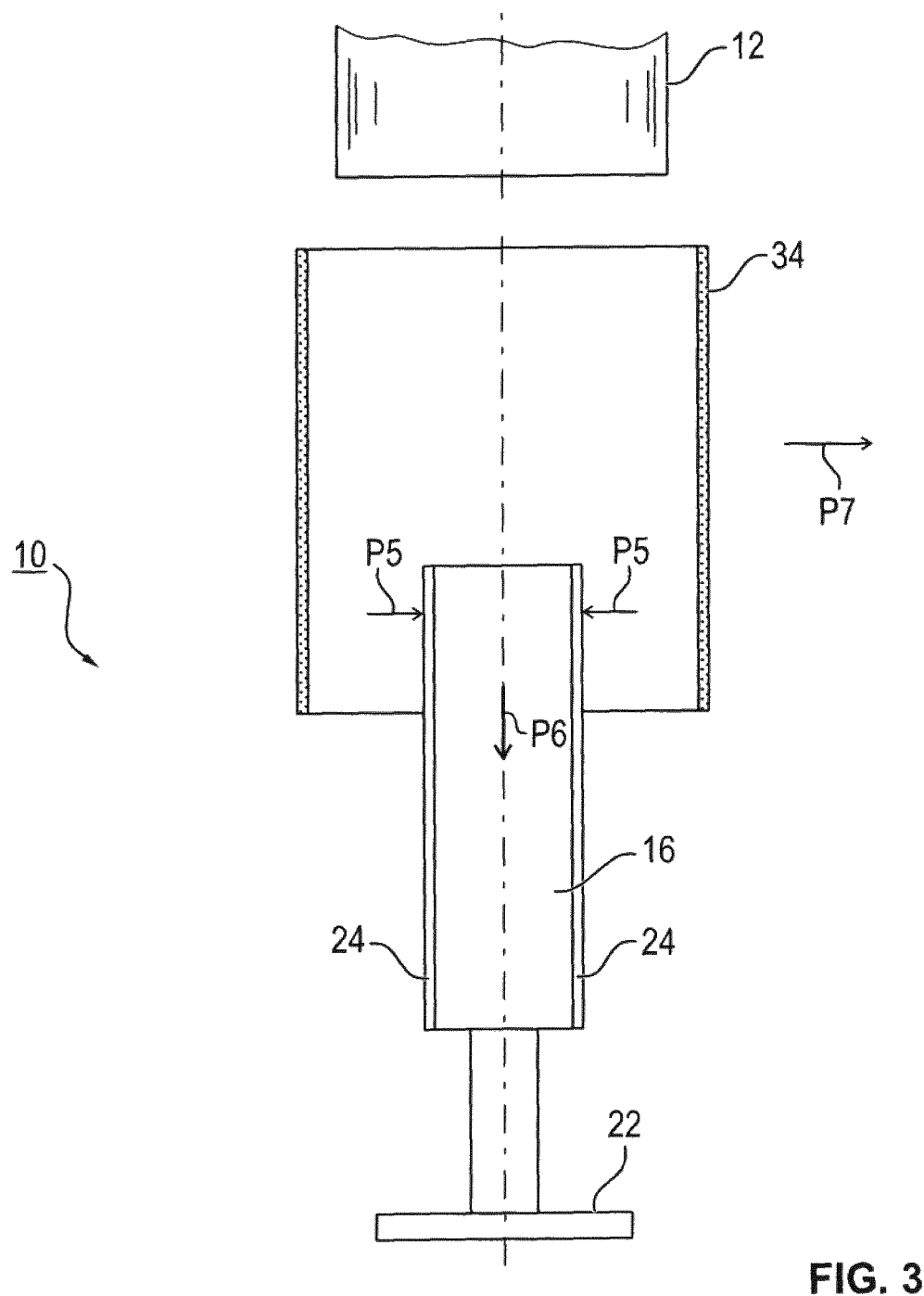
FIG. 3 shows the operating state after the cooling and the subsequent lateral removal of the tubular body.

FIG. 3 shows the state after cooling. The expanding elements 24, 26 of the expanding mandrel 16 move along the arrows P5 into the retracted state, and the expanding mandrel 16 is moved in the direction of the arrow P6 downwards in the direction of the base plate 22. In the cooled-off state, the preform 14 may be removed from the machine 10 as a tubular body 34 laterally in the direction of the arrow P7.

Figure 4:
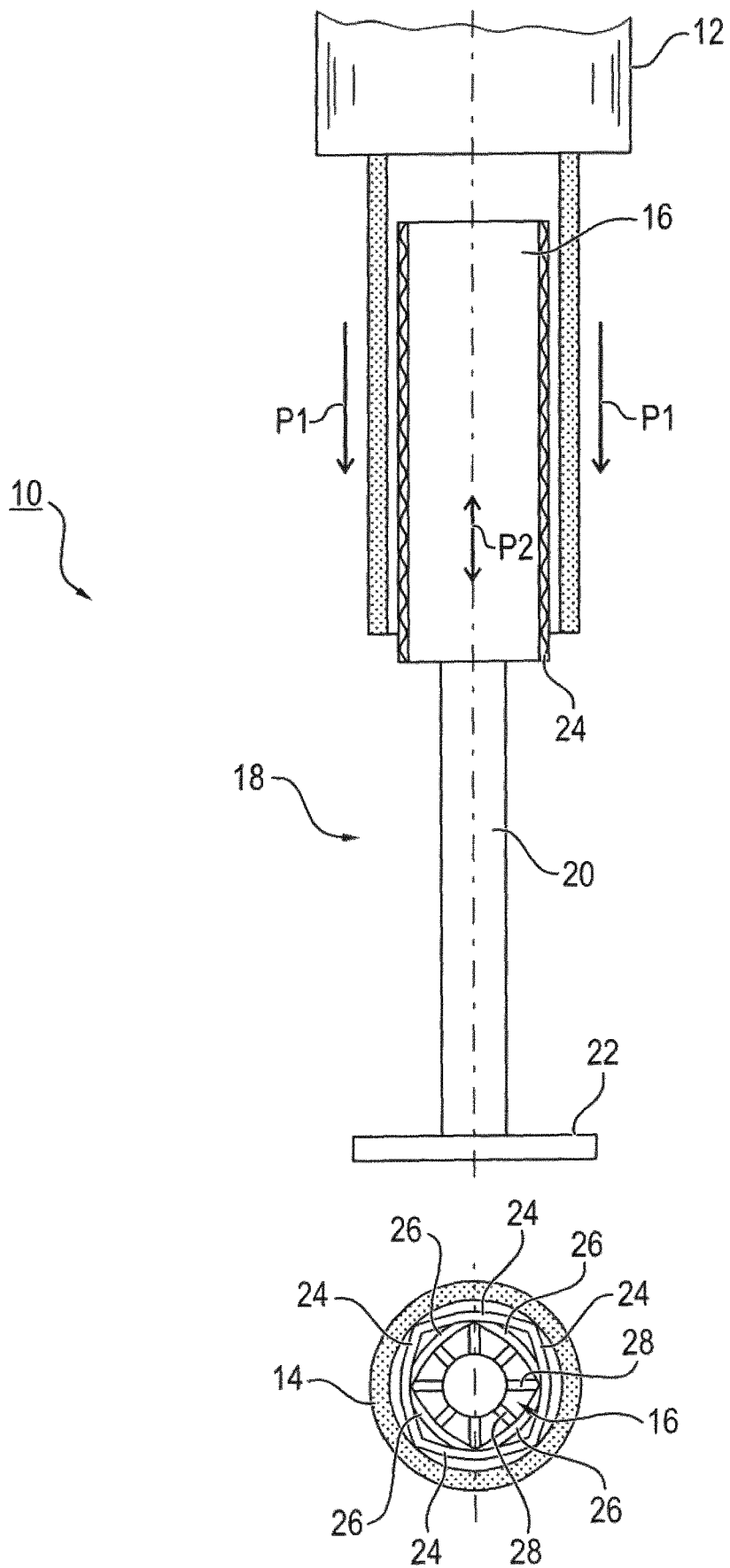
FIG. 4 shows a machine for producing a single-walled corrugated body in a side view and a top view.

FIGS. 4 to 7 refer to a machine for producing a single-walled corrugated tubular body. The shaping of the corrugated tube takes place by means of the expanding mandrel 16, the expanding elements 24, 26 of which are not formed smoothly as in the previous Figures but in a corrugated manner with grooves. The production process substantially is performed as in the previous FIGS. 1 to 3, however with the difference that the preform 14 is now output over a non-expanded expanding mandrel 16, the expanding elements 24, 26 of which have a corrugated tube profile, discontinuously in the direction of the arrow P1, as shown in FIG. 4.

Figure 5:
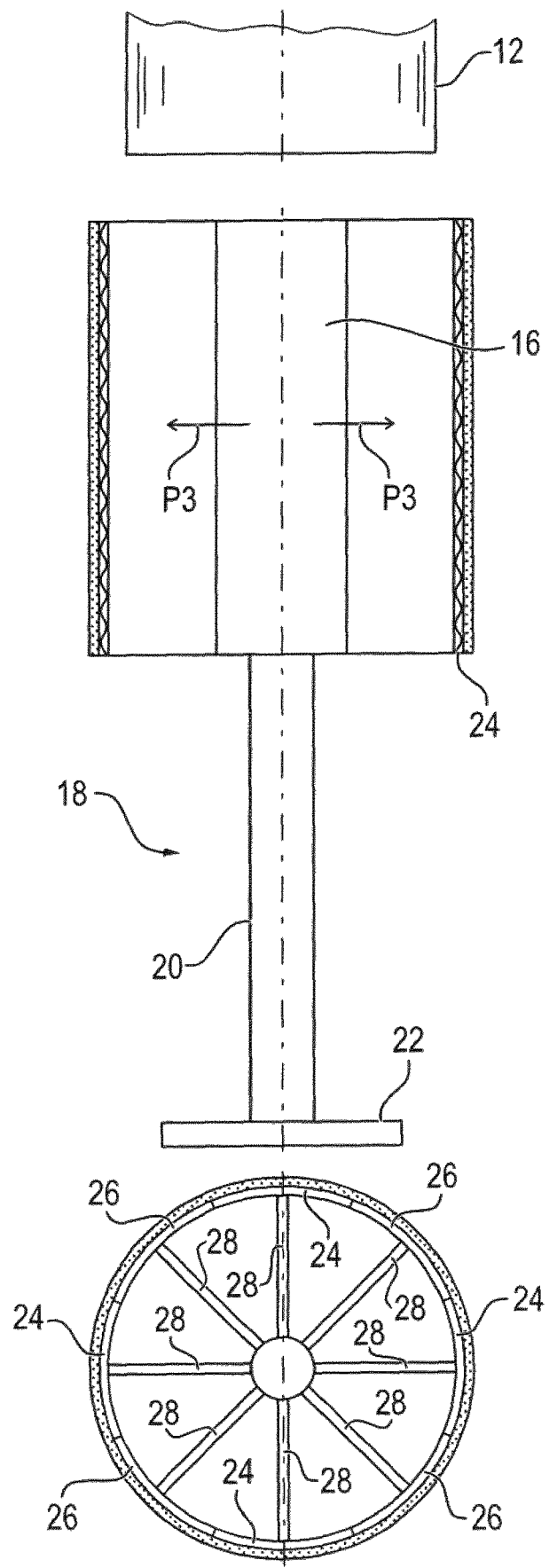
FIG. 5 shows the operating state of the machine with expanded groove-shaped expanding elements.

FIG. 5 shows a state similar to FIG. 2, with expanding elements 24, 26 expanded in the direction P3. The preform 14 rests on the corrugated tube-shaped surface of the expanding elements 24, 26, but has not yet adopted the desired corrugated tube profile.

Figure 6:
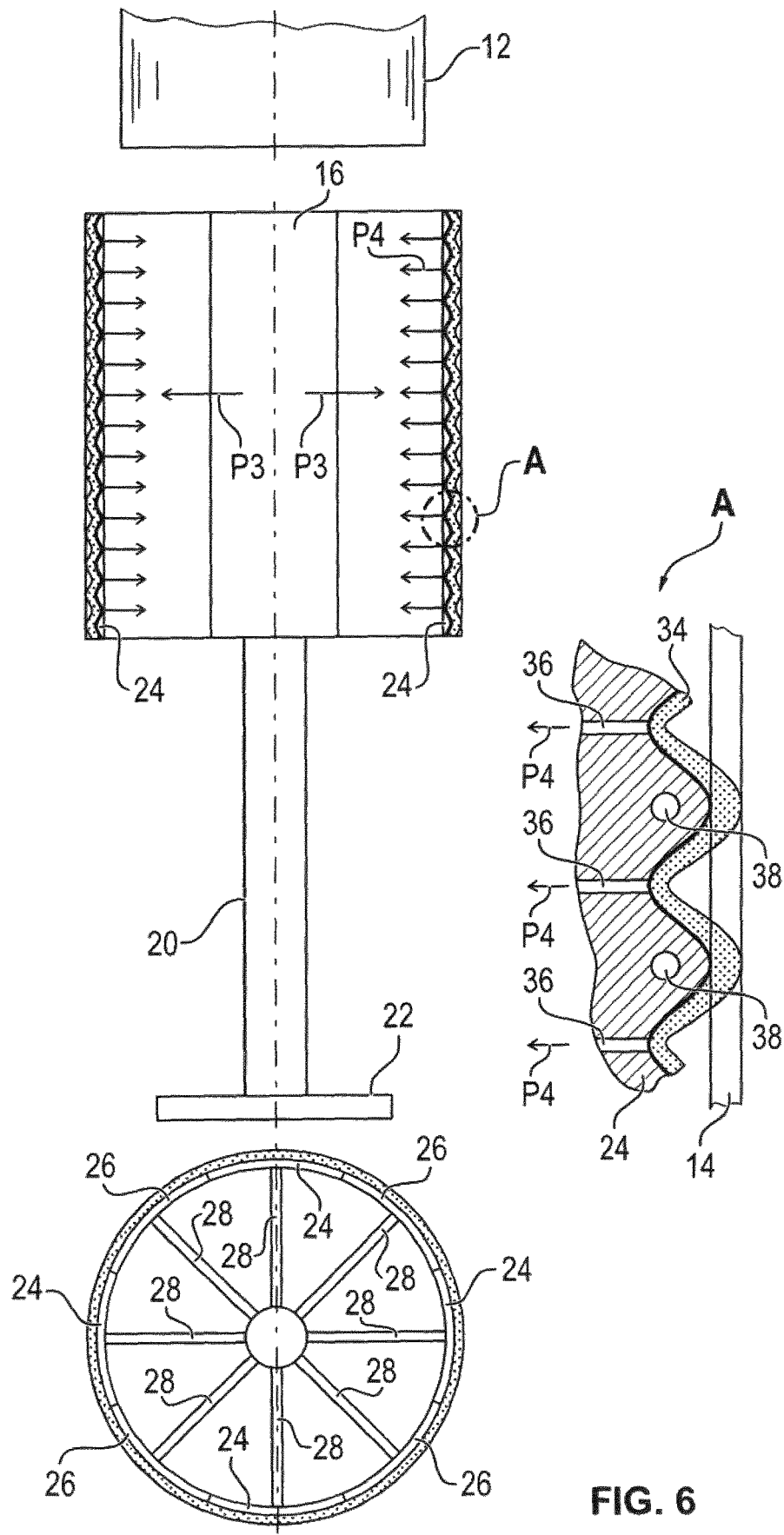
FIG. 6 shows the forming of the preform into a corrugated profile and a partial section of the corrugated profile.

FIG. 6 shows the forming of the preform 14 into a corrugated tube profile. For this, a vacuum is applied to the expanding elements 24, 26, indicated by arrows P4 so that the warm preform 14 adopts the corrugated tube profile of the expanding elements 24, 26. An enlargement of the detail A shows that the wall thickness of the tube profile of the later finished tubular body 34 is formed differently starting from the smooth profile of the preform 14. By extending the preform 14, a larger wall thickness is created at the outer circumference than at the inner diameter of the corrugated tube profile. This results in a different cooling-off behavior within the preform 14. Since during cooling, the melt solidification point is reached earlier at the inner diameter than at the outer diameter, a stress gradient within the profile wall occurs as a result of the different shrinking behavior. This inner stress results in an increase in the ring stiffness, which means in practice that in the case of such a finished tubular body 34 deformation occurring when stress is applied from outside is reduced. This is a further technical advantage of this production method.

In the detail A, bores 36 for applying a vacuum can be seen. Further, bores 38 for the liquid cooling are present.

Figure 7:
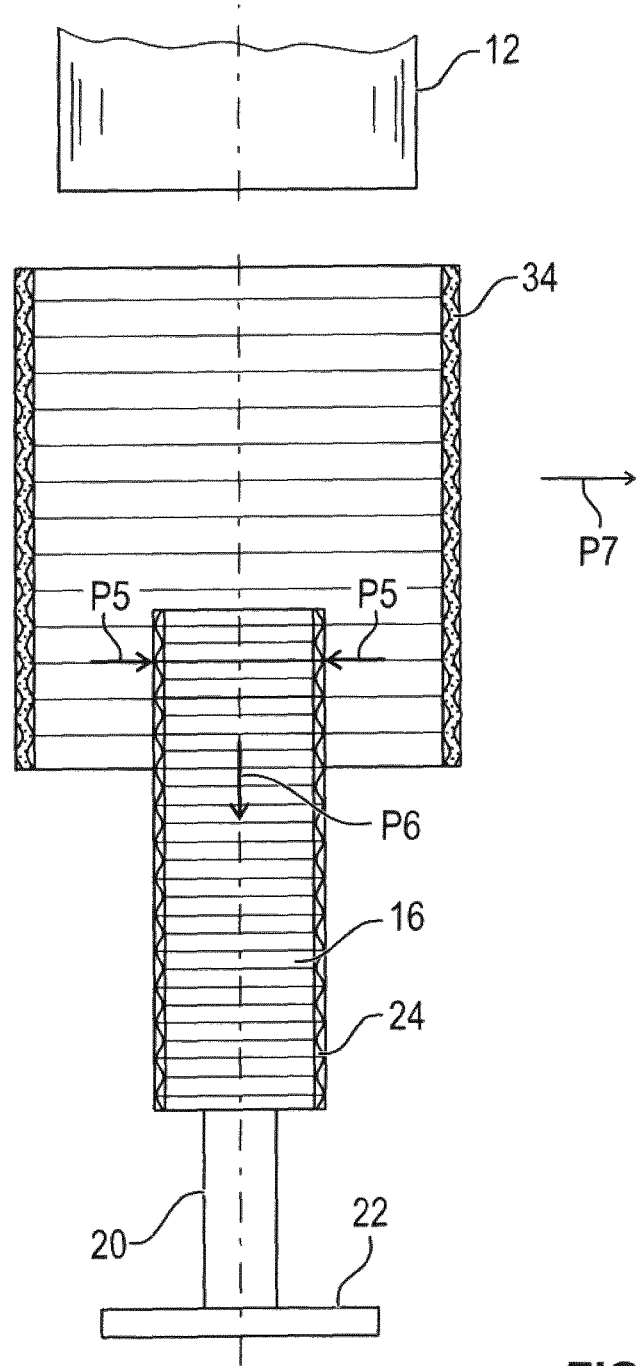
FIG. 7 shows the operating state of the machine prior to the lateral removal of the corrugated single-walled tubular body.
Figure 8:
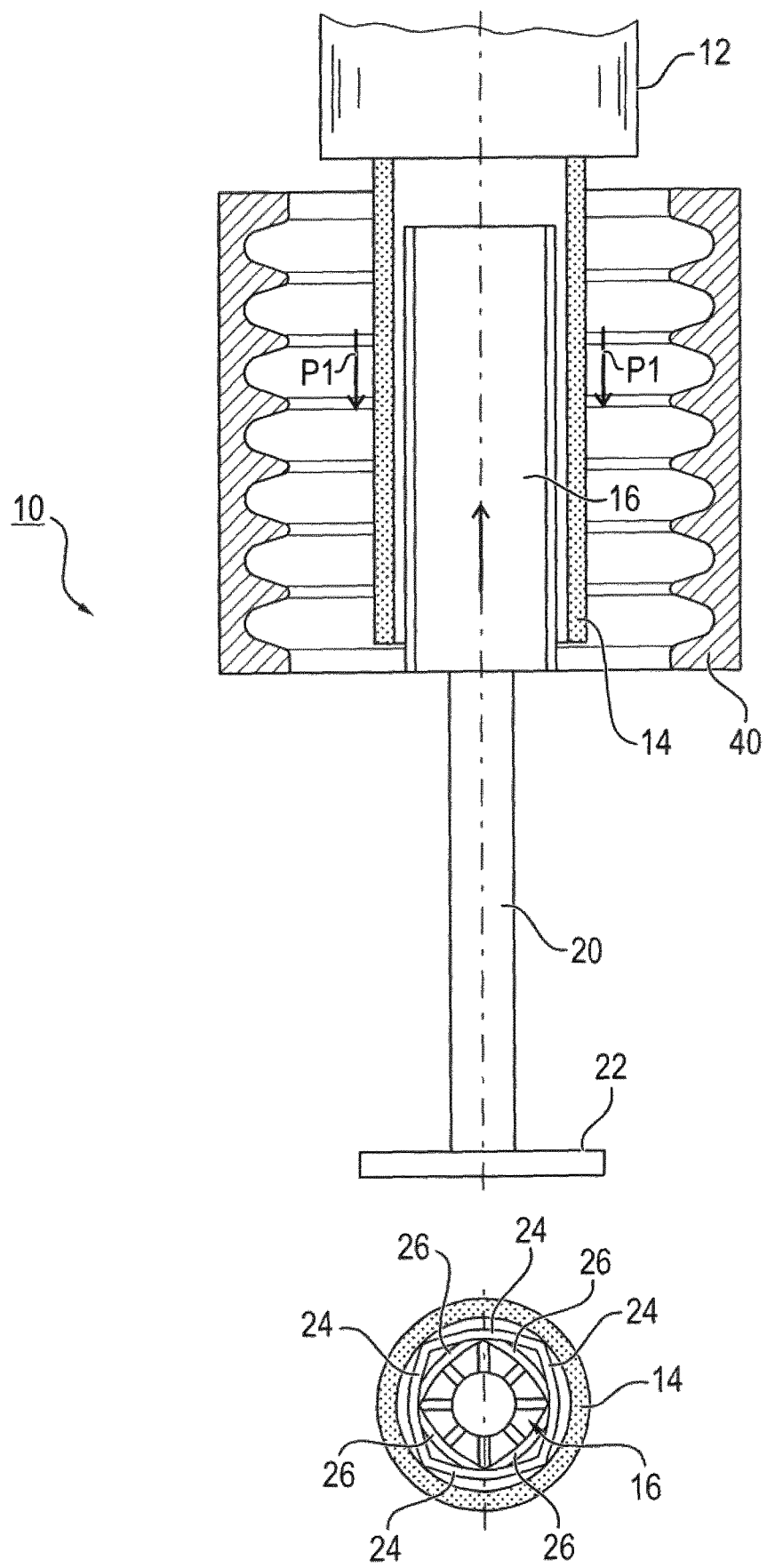
FIG. 8 shows a machine for producing a single-walled corrugated tubular body using a hollow mold, in a side view and a top view.

Similar to FIG. 3, FIG. 7 shows the retracting of the expanding elements 24, 26 in the direction P5 and the moving down of the expanding mandrel 16 in the direction P6. The finished corrugated single-walled tubular body 34 is removed from the machine 10 in the direction P7.

FIGS. 8 to 11 show the machine 10 for producing a single-walled corrugated tubular body, which is formed with the aid of a two-part hollow mold 40. According to FIG. 8, this hollow mold 40 is arranged at the same height around the expanding mandrel 16 in its upper position. Otherwise, the structure corresponds to that of FIG. 1.

Figure 9:
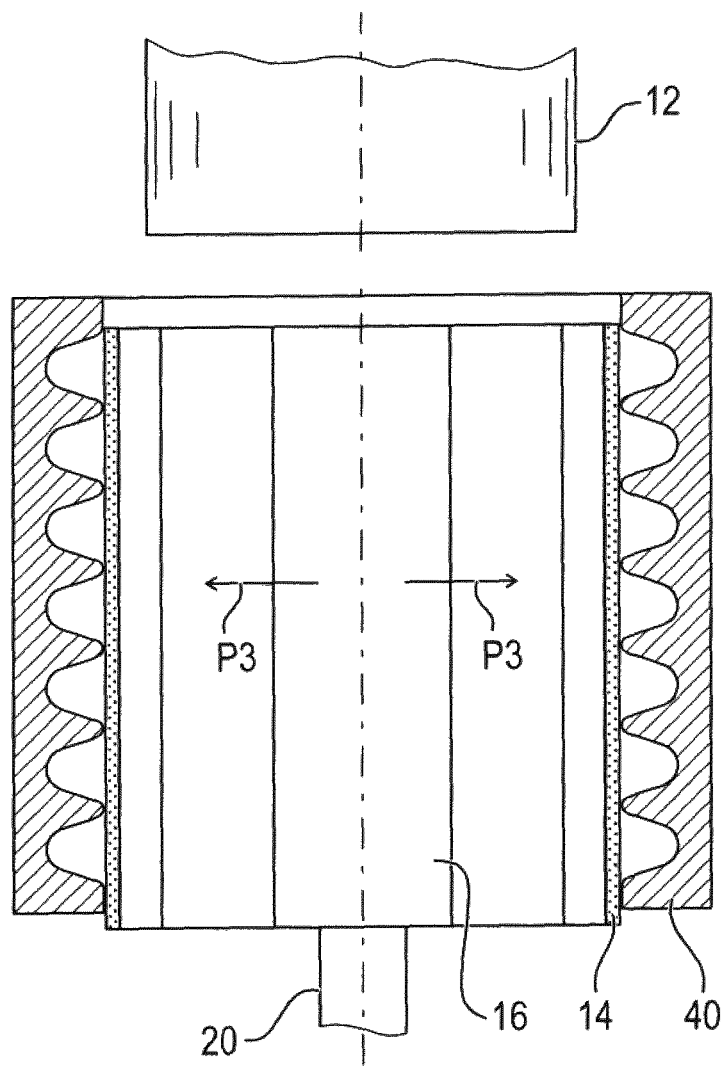
FIG. 9 shows the state of the expansion, the preform being pressed against a corrugated tube profile of the hollow mold.

According to FIG. 9, the expansion takes place like in FIG. 2, the preform 14 being pressed against a corrugated tube profile of the hollow mold 40.

Figure 10:
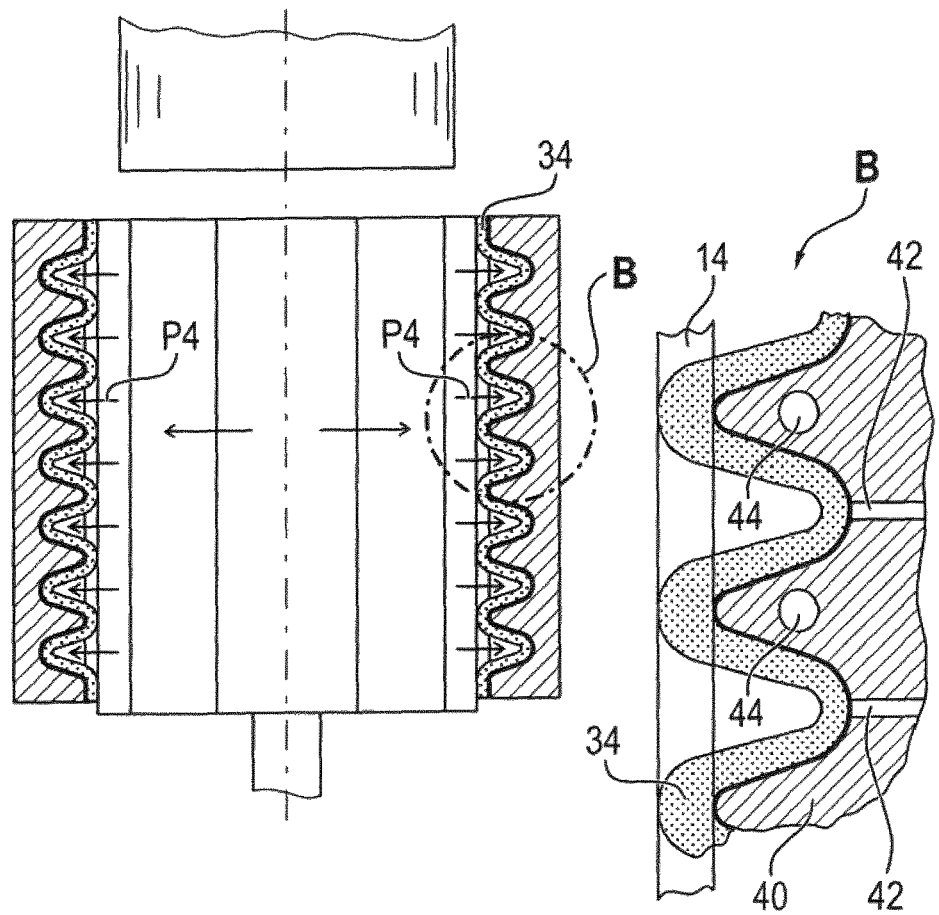
FIG. 10 shows the forming of the preform into the corrugated tubular body while applying a vacuum to the hollow mold, and an enlarged partial detail.

FIG. 10 shows the forming of the preform 14 into a corrugated tubular body. For this, a vacuum is applied to the hollow mold 40 and/or compressed air is applied to the expanding elements 24, 26. In the enlarged detail B, it can be seen that by the expansion of the preform 14 the larger wall thickness is now formed at the inner diameter. The hollow mold 40 includes bores 42 for applying the vacuum, and bores 44 for liquid cooling.

Figure 11:
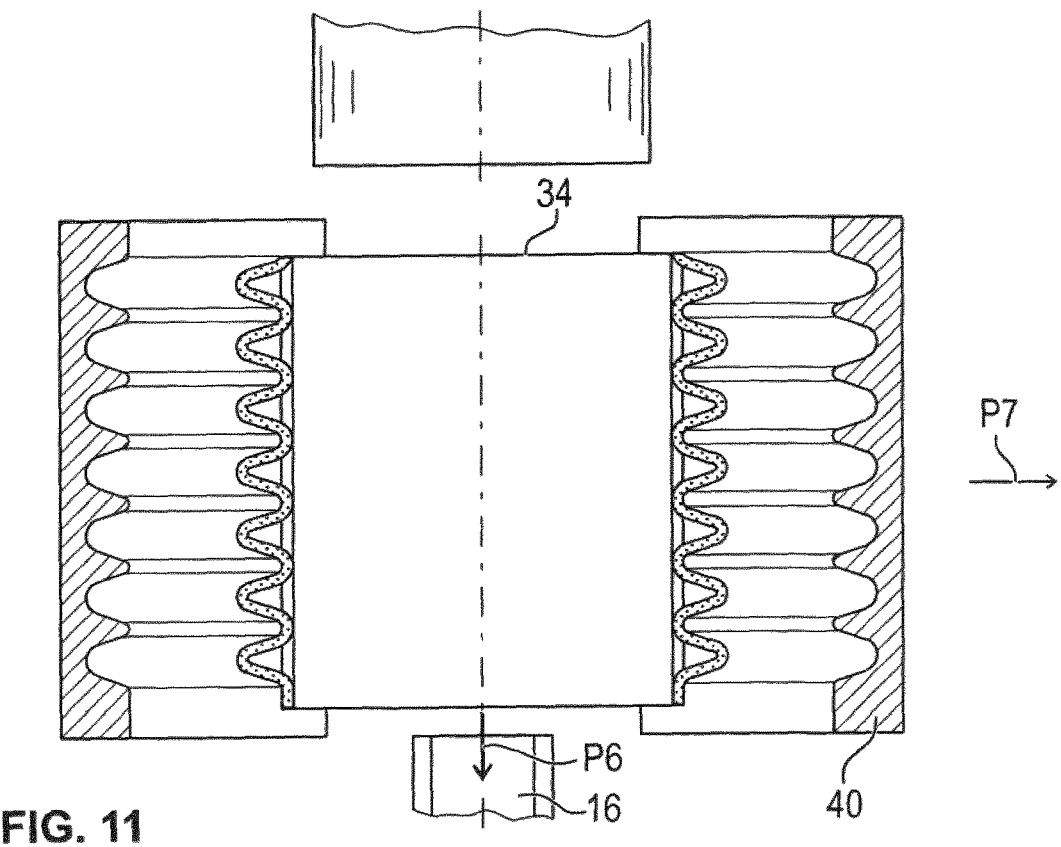
FIG. 11 shows the operating state after the cooling of the preform and the removal of the single-walled corrugated tubular body.
Figure 12:
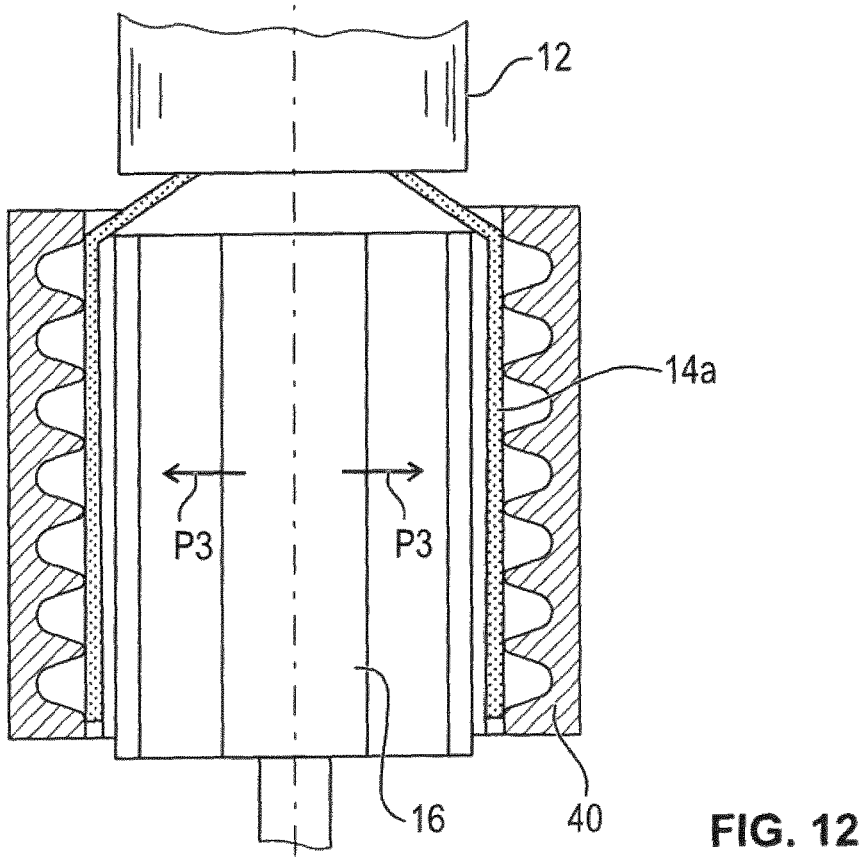
FIG. 12 schematically shows the production of a double-walled corrugated tubular body with the output of a first preform.
Figure 13:
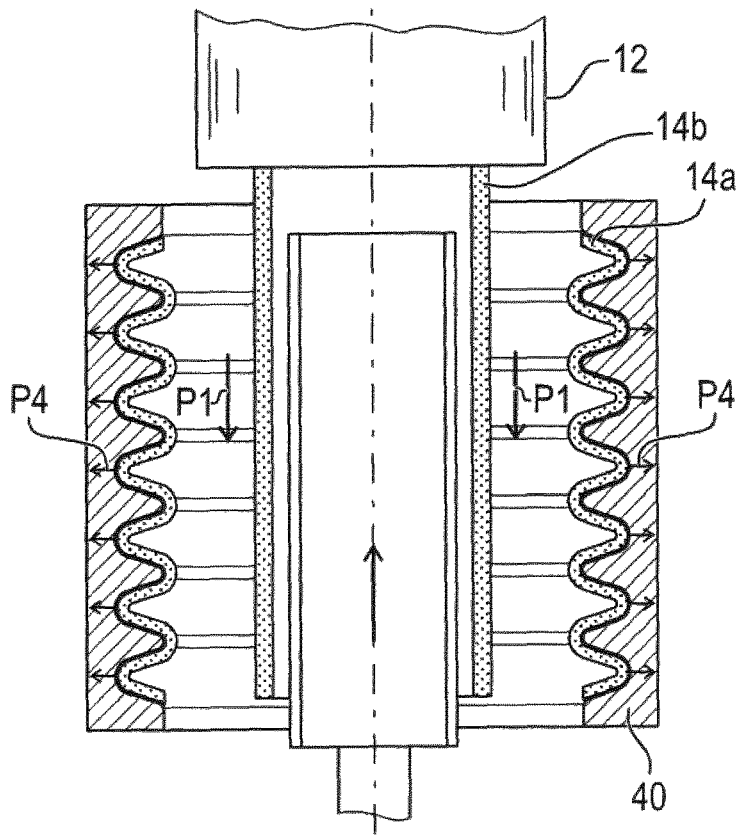
FIG. 13 schematically shows the output of the second preform into the open hollow mold.

FIG. 11 shows the state after cooling the preform 14, which thus becomes the tubular body 34. The two-part hollow mold 40 is opened and the single-walled corrugated tubular body 34 is laterally removed after lowering the expanding mandrel 16.

Figure 14:
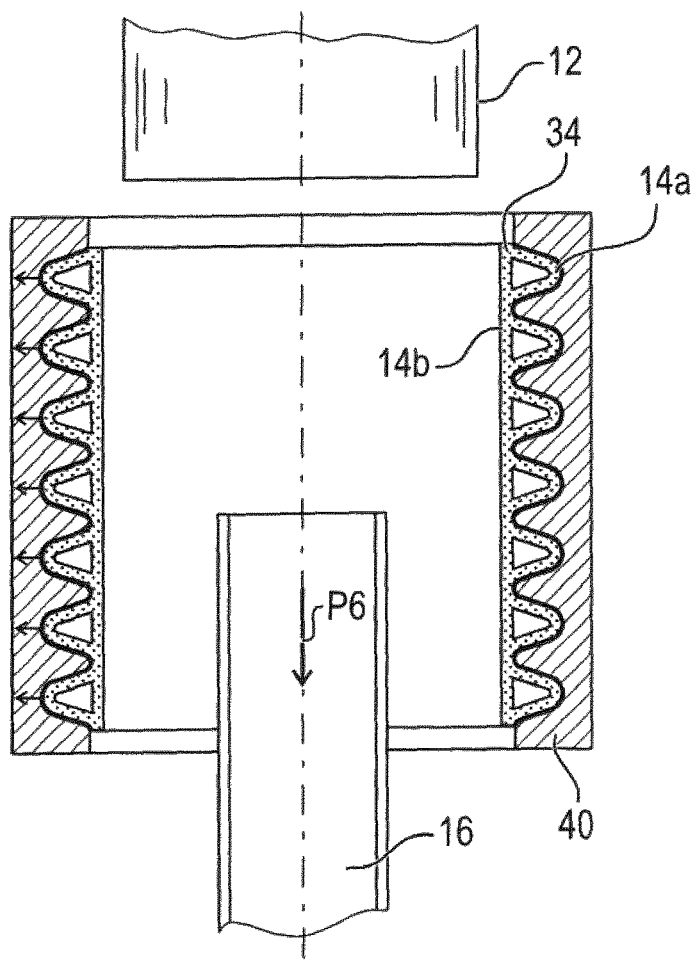
FIG. 14 shows the operating state after expansion, a first preform and a second preform welding together.
Figure 15:
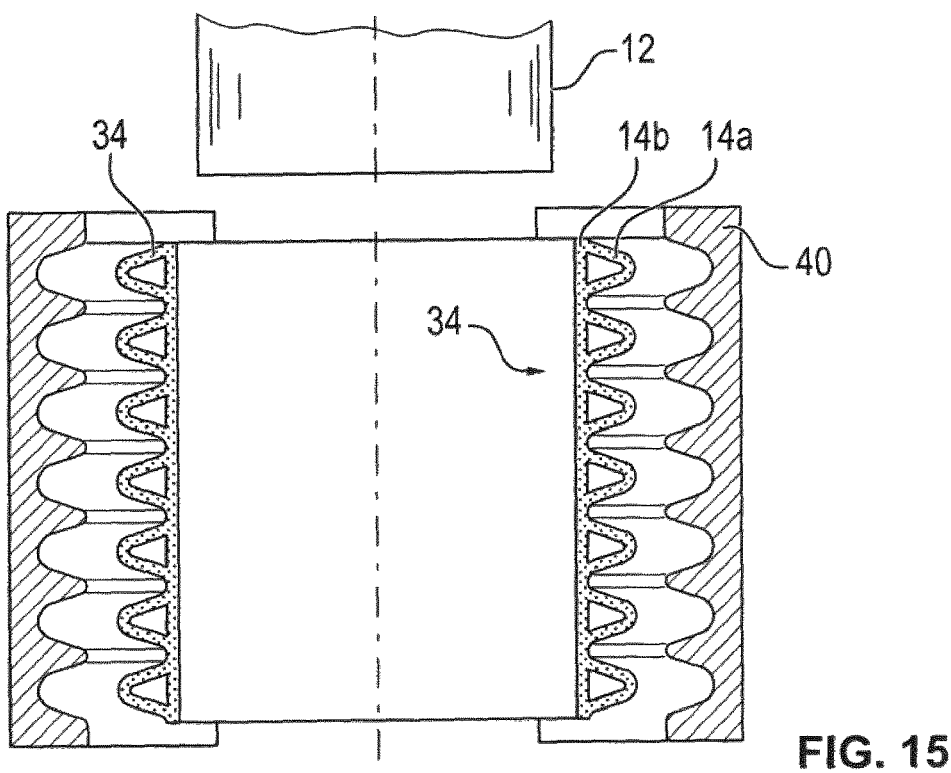
FIG. 15 shows the operating state with open hollow mold and the removal of the double-walled corrugated tubular body.

FIGS. 12 to 15 show the machine 10 for producing a double-walled corrugated tubular body. According to FIGS. 12 and 13, in a first process step, a single-walled corrugated tube-shaped preform 14a is produced. This takes place similarly to the sequence described in connection with FIGS. 8 to 11. According to FIG. 13, the expanding mandrel 16, after forming the corrugated tube form for the first preform 14a, moves with its expanding elements 24, 26 into its retracted position, and the nozzle head 12 outputs a further preform 14b into the open hollow mold 40. Then, according to FIG. 14, the expanding mandrel 16 is expanded until its expanding elements 24, 26 bring the preform 14b into contact with the corrugated profile of the first preform 14a. This preform 14a is in the hollow mold 40 in a still warm state. By applying a vacuum and/or pressure from the inside onto the further preform 14b, the first preform 14a and the further preform 14b weld together at contact points. Thereafter, the cooling process for both preforms 14a, 14b takes place, as a result whereof the finished tubular body 34 is formed. Subsequently, the expanding mandrel 16 is moved downwards. This state is shown in FIG. 14. Afterwards, the hollow mold 40 is opened and the finished double-walled corrugated tubular body 34 is removed (FIG. 15).

Instead of a hollow mold 40 with a corrugated profile, also a hollow mold (not illustrated) with a corrugated profile that is only formed section-wise circumferentially or with a cup profile may be used. In the case of this cup profile, cup-shaped elevations are formed on the inner side of the hollow mold. The first preform adopts the cup-shaped profile by the application of a vacuum, and welds together with the second preform at points of contact, as a result whereof a double-walled cup-shaped tubular body is formed.

As can be taken from the top view of FIG. 1, the expanding elements 24, 26 of the expanding mandrel 16 are nested in one another, so that the expanding mandrel 16 has little transverse dimensions in the retracted state in order to enable its arrangement inside the tubular preform 14. During the expansion process, at first the externally arranged expanding elements 24 are extended by the drives 28 and afterwards the internally arranged expanding elements 26 so that, as illustrated in FIG. 2 at the bottom, they cover the entire inner circumferential surface of the preform 14 in the expanded state thereof.

In the following, an expanding device 18 is presented, which makes it possible to realize the expansion process with compact transverse dimensions of the expanding mandrel 16. Accordingly, also the inner diameter of the tubular preform 14 may be reduced in size. Here, the expansion process is divided into a pre-expansion and into a total expansion. Accordingly, the expanding mandrel 16 comprises a first partial mandrel 50 with first expanding elements 24 and a second partial mandrel 52 with second expanding elements 26. FIGS. 16 to 19 show this schematically.

Figure 16:
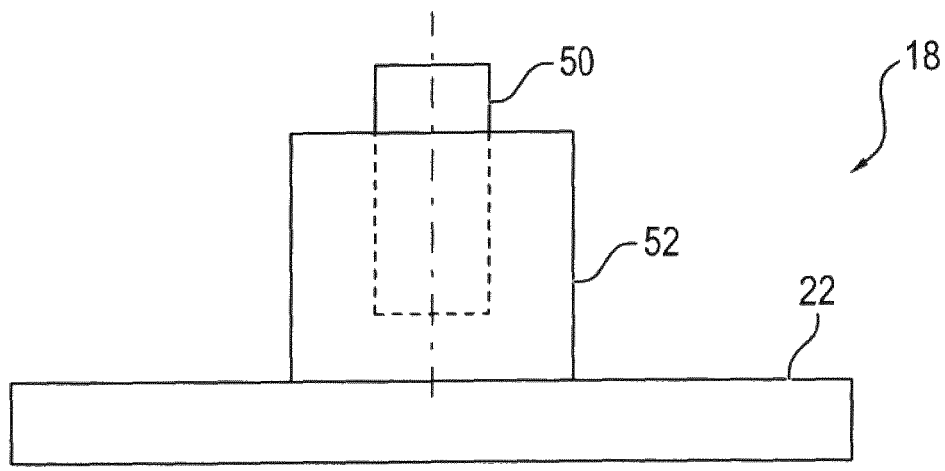
FIG. 16 shows an expanding device with a two-part expanding mandrel.

FIG. 16 shows the expanding device 18 with base plate 22 and a first partial mandrel 50 and a second partial mandrel 52 in the lowered state in which both partial mandrels 50, 52 are close to the base plate 22.

Figure 17:
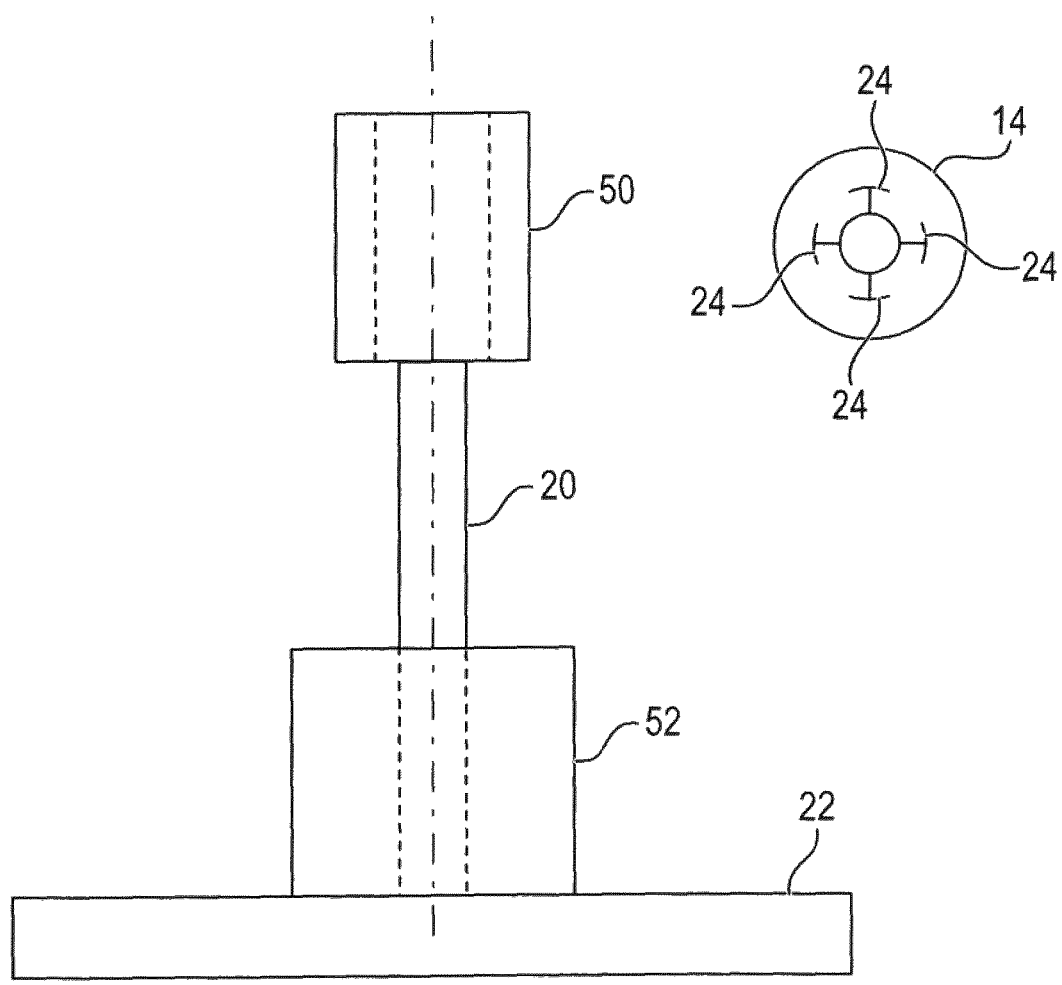
FIG. 17 shows a schematic illustration in a side view and a top view with the first partial mandrel not being expanded yet.

FIG. 17 shows that at first the first partial mandrel 50 is moved along the guiding element 20 upwards into the upper position, in which the partial mandrel 50 with slim first expanding elements 24 is arranged in the interior of the extruded preform 14 (see schematic top view at the right).

Figure 18:
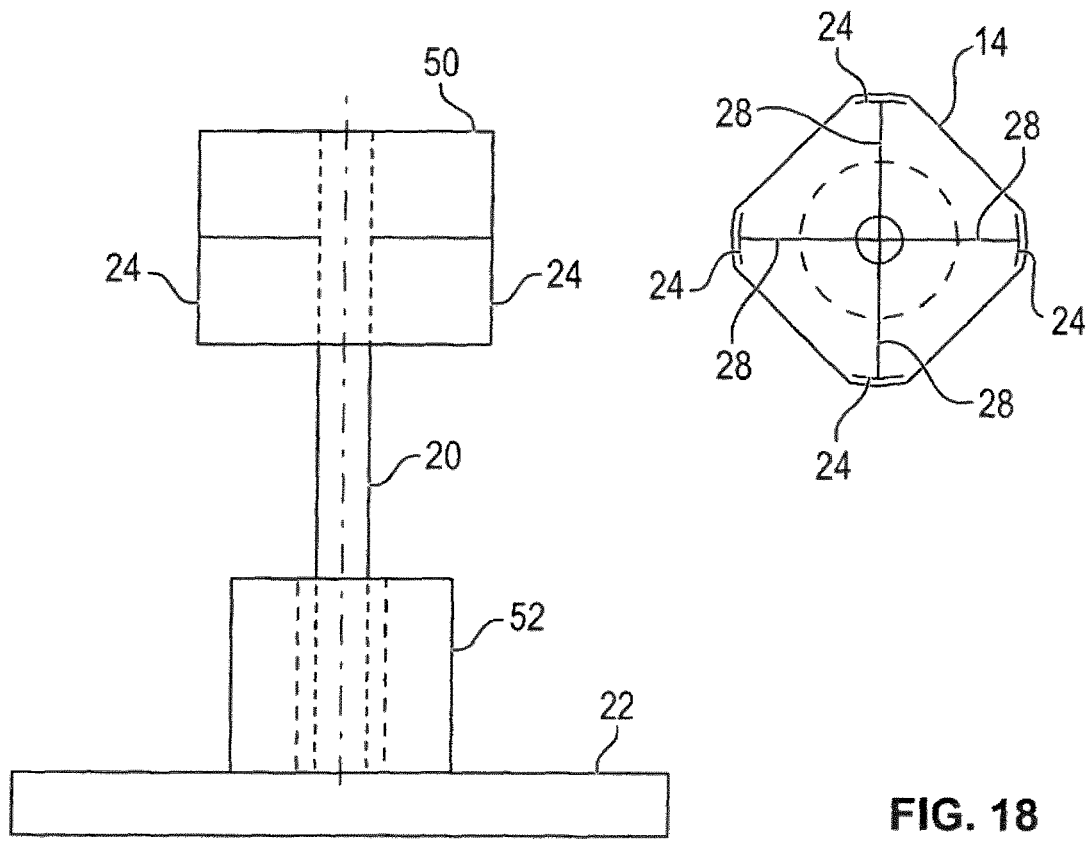
FIG. 18 shows an illustration with expanded first partial mandrel and extended first expanding elements.

FIG. 18 shows the state with extended first expanding elements 24. This extension is caused by the drives 28, for example by telescopic hydraulic drives. As can be seen, thus a pre-expansion takes place, in which the interior of the preform 14 is enlarged.

Figure 19:
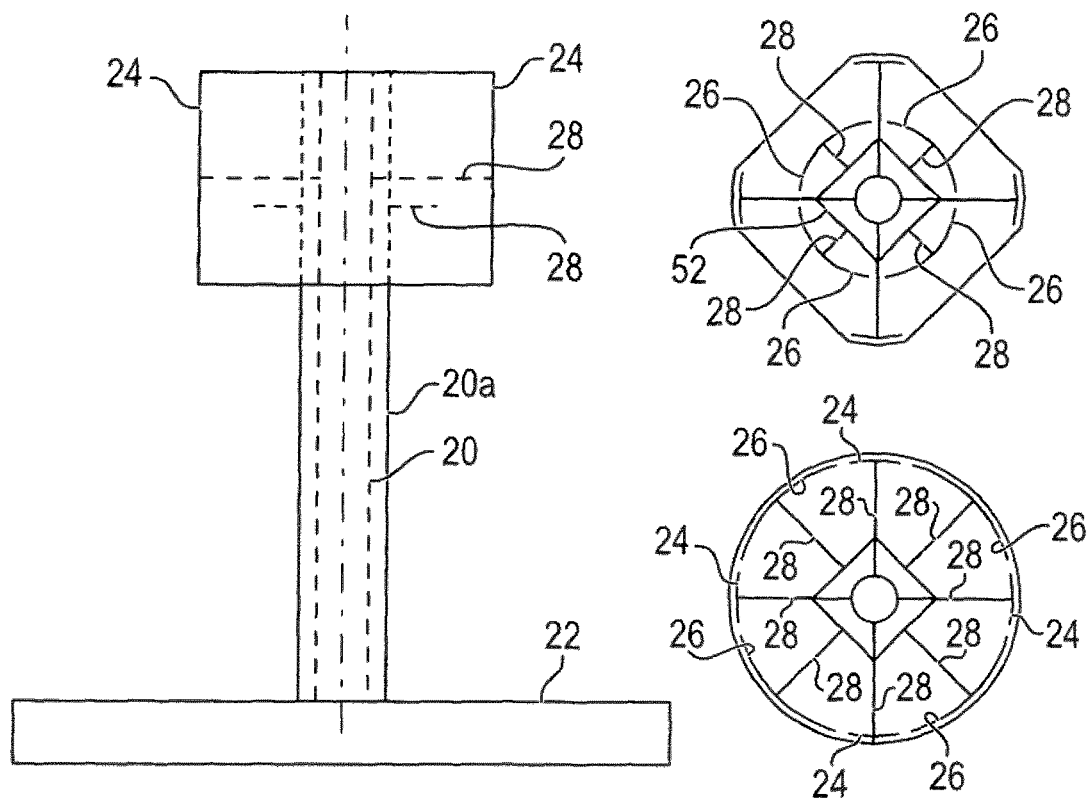
FIG. 19 shows the first partial mandrel and the second partial mandrel in the upper position and with extended first expanding elements and second expanding elements.

According to FIG. 19, the second partial mandrel 52 is moved with further guiding means 20a along the guide 20 by means of electric or hydraulic drives into this enlarged space. The second partial mandrel 52 comprises second expanding elements 26 which are likewise moved by drives 28. The second expanding elements 26 cover a larger segment than the first expanding elements 24. The first expanding elements 24 and the second expanding elements 26 interact such that they completely cover the inner circumferential surface as ring segments. It is advantageous to arrange the drives 28 for the first expanding elements 24 and the drives 28 for the second expanding elements at different heights. The expanding device described in FIGS. 16 to 19 may also be used for the embodiments according to FIGS. 1 to 15.

Figure 20:
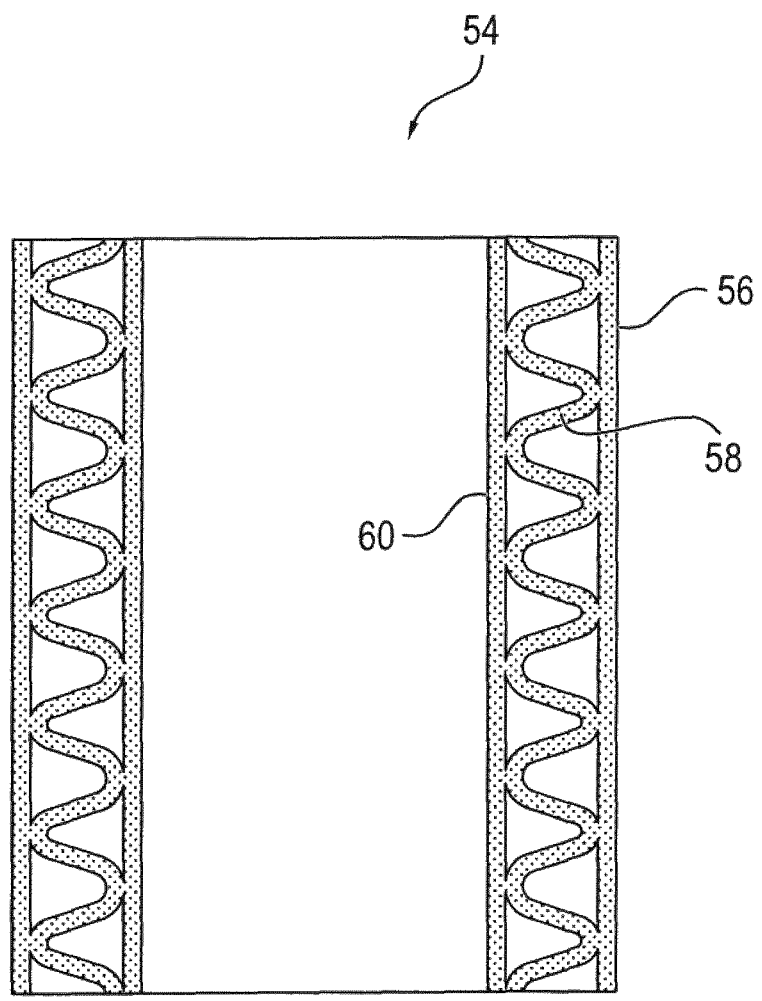
FIG. 20 shows a triple-walled tubular body.

In the following, the production of a triple-walled tubular body 54 is described, in which successively three preforms are output by the nozzle head 12. FIG. 20 shows the finished product with a smooth outer wall 56, a smooth inner wall 60 and a corrugated middle wall 58 arranged therebetween. During the production, a first preform is produced, as described in FIGS. 1 to 4. For this, the used first expanding mandrel has smooth expanding elements and the smooth outer wall 56 is formed. Then, a second preform is output concentrically to the first preform, and expanded by means of a second expanding mandrel. Its expanding elements have a corrugated profile at least in sections or a cup profile and expand the second preform so far that it welds to the still warm first preform at contact points. Afterwards, the third preform is output concentrically to the second preform, which is expanded by means of a third expanding mandrel with smooth expanding elements so far that it welds to the still warm second preform at contact points. The third preform forms the smooth inner wall 60 in the finished triple-walled tubular body 54.

As mentioned, different expanding mandrels are used during the production of the triple-walled tubular body 54. The different expanding mandrels may be arranged on a common base plate and each time be moved into the required position under the nozzle head by a linear movement on the base plate or by pivoting.

In principle, also tubular bodies may be produced that have more than three walls. Each wall may also comprise several layers by means of co-extrusion.

With the aid of the described production method and the machine, single-walled or multiple walled tubular bodies may be produced from thermoplastic material, the dimension of which in a transverse direction may amount to 1600 to 2400 mm. Lengths L from 1.5 m to 6 m may be obtained. Based thereon, tubular bodies with volumes from 8 $m^3$ to 32 $m^3$ (please add) may be produced. The cross-sectional shape is not restricted to a circular shape but square, rectangular, elliptical cross-sections may be obtained by means of a constructive design of the expanding elements and the associated drives.

The invention claimed is:

1. A method for producing at least a single-walled tubular body from thermoplastic material in a machine,
    in which at least one tubular preform is output from the nozzle head of an extrusion device,
    the at least one tubular preform is guided vertically downwards,
    the at least two-part hollow mold having one of a corrugated profile or a cup profile is arranged around the at least one tubular preform,
    the at least one tubular preform is expanded in an expansion process by an expanding mandrel having one of corrugated expanding elements or expanding elements provided with cups, the expanding mandrel being arranged centrically to the nozzle head to a predefined dimension in a transverse direction and to a predefined shape, wherein the at least one tubular preform is pressed against one of a corrugated profile ort a cup profile of the hollow mold and the at least one tubular preform adopts the shape of one of the corrugated profile or the cup profile by applying one of a vacuum to the hollow mold or compressed air to the expanding mandrel, the preform remaining open at the top and bottom,
    after cooling the at least one tubular preform, the expanding mandrel is moved into a non-expanded state,
    and in which afterwards the at least single-walled tubular body is removed from the machine.

2. The method according to claim 1, in which for producing a double-walled tubular body, the expanding mandrel is moved into a retracted state after forming the at least one tubular preform by means of the hollow mold having one of a corrugated profile or a cup profile,
    afterwards, at least one second tubular preform is output from the nozzle head, which faces the not yet cooled at least one tubular preform in the hollow mold having one of the corrugated profile or cup profile,
    the expanding mandrel expands the at least one second preform and brings it into contact with the at least one tubular preform present in the hollow mold, so that the at least one second preform welds to the at least one tubular preform present in the hollow mold at contact points,
    and in which the at least one tubular preform in the hollow mold and also the at least one second preform are cooled off together.

3. a. A method for producing a triple-walled tubular body in which a first preform is output and is expanded by a first expanding mandrel with smooth expanding elements,
    b. afterwards, a second preform is output concentrically to the first preform and is expanded by a second expanding mandrel with one of corrugated or cup-shaped expanding elements so far that it welds to the still warm first preform at contact points,
    c. and afterwards, a third preform is output concentrically to the second preform and is expanded by a third expanding mandrel with smooth expanding elements so far that it welds to the still warm second preform at contact points, and in which the three preforms are cooled off,
    d. wherein the third preform is pressed against one of a corrugated profile or a cup-shaped profile of the second preform and the third preform adopts the shape of one of the corrugated profile or the cup profile by applying one of a vacuum to the hollow mold or compressed air to the third expanding mandrel.

4. The method according to claim 1, in which the expanding mandrel is moved vertically downwards after cooling the at least one tubular preform and afterwards the cooled-off tubular body is removed from the machine.

5. The method according to claim 1, in which after cooling the at least one tubular preform a lateral relative movement of the expanding mandrel to the nozzle head is performed, and the cooled-off tubular body is removed upwards from the machine.

6. The method according to claim 1, in which for cooling the at least one tubular preform, the forming elements of the expanding mandrel are cooled from outside by one of a cooling device or a fan or applying a vacuum to the forming elements for accelerating the cooling process.

7. The method according to claim 1, wherein the expanding mandrel comprises a first partial mandrel and a second partial mandrel, with the aid of which during the expansion process at first a pre-expansion by means of the first partial mandrel takes place, in which the first expanding elements expand the interior in the preform so far that a space is created in the interior for the second partial mandrel, the second expanding elements of which expand the preform up to the predefined dimension and shape in a transverse direction.

8. A machine for producing at least a single-walled tubular body from thermoplastic material,
in which at least one tubular preform is output from the nozzle head of an extrusion device,
the at least one tubular preform is guided vertically downwards,
the at least two-part hollow mold having one of a corrugated profile or a cup profile is arranged around the at least one tubular preform,
the at least one tubular preform is expanded in an expansion process by an expanding mandrel having one of corrugated expanding elements or expanding elements provided with cups, the expanding mandrel being arranged centrically to the nozzle head to a predefined dimension in a transverse direction and to a predefined shape, wherein the at least one tubular preform is pressed against one of a corrugated profile or a cup profile of the hollow mold and the at least one tubular preform adopts the shape of one of the corrugated profile or the cup profile by applying one of a vacuum to the hollow mold or compressed air to the expanding mandrel, the at least one tubular preform remaining open at the top and bottom,
the expanding mandrel moves into a non-expanded state after cooling the at least one tubular preform.

9. The machine according to claim 8, in which for producing one of a double-walled corrugated or cup-shaped tubular body, the expanding mandrel is moved into a retracted state after forming the at least one tubular preform by means of the hollow mold having the one of the corrugated profile or the cup profile,
afterwards at least one second tubular preform is output from the nozzle head, which at least one second tubular preform faces the not yet cooled at least one tubular preform in the hollow mold having the one of the corrugated profile or cup profile,
the expanding mandrel expands the at least one second preform and brings it into contact with the at least one tubular preform present in the hollow mold so that the at least one second preform welds to the at least one tubular preform present in the hollow mold at contact points,
and in which the at least one tubular preform in the hollow mold and also the at least one second preform are cooled off together.

10. The machine according to claim 8, wherein after cooling the at least one tubular preform a lateral relative movement of the expanding mandrel to the nozzle head takes place.

11. The machine according to claim 8, in which for cooling the at least one tubular preform the forming elements of the expanding mandrel are cooled from outside by one of a cooling device or by a fan or applying a vacuum to the forming elements for accelerating the cooling process.

12. The machine according to claim 8, wherein the expanding mandrel comprises a first partial mandrel and a second partial mandrel, with the aid of the which during the expansion process at first a pre-expansion by means of the first partial mandrel takes place, in which the first expanding elements enlarge the inner space of the at least one tubular preform so far that a space is created in the interior for the second partial mandrel, the second expanding elements of which expand the at least one tubular preform up to the predefined dimension and shape in a transverse direction.

13. The method according to claim 3, in which the expanding mandrel is moved vertically downwards after cooling the three preforms and afterwards the cooled-off tubular body is removed from the machine.

14. The method according to claim 3, in which for cooling the three preforms, the forming elements of the expanding mandrel are cooled from outside by one of a cooling device or a fan or for accelerating the cooling process, applying a vacuum to the forming elements.

15. The method according to claim 3, wherein the expanding mandrel comprises a first partial mandrel and a second partial mandrel, with the aid of which during the expansion process at first a pre-expansion by means of the first partial mandrel takes place, in which the first expanding elements expand the interior in the preform so far that a space is created in the interior for the second partial mandrel, the second expanding elements of which expand the preform up to the predefined dimension and shape in a transverse direction.

* * * * *

UNITED STATES PATENT AND TRADEMARK OFFICE
CERTIFICATE OF CORRECTION

PATENT NO. : 11,951,669 B2
APPLICATION NO. : 16/980784
DATED : April 9, 2024
INVENTOR(S) : Gunter Richter It is certified that error appears in the above-identified patent and that said Letters Patent is hereby corrected as shown below:

In the Claims

Column 8, Claim 1, Line 5:
"the at least two-part"
Should be:
"an at least two-part"

Column 8, Claim 1, Line 19:
"profile ort a cup"
Should be:
"profile or a cup"

Column 9, Claim 6, Line 15:
"or a fan or applying a vacuum to the forming elements for accelerating the cooling process"
Should be:
"or a fan or for accelerating the cooling process, applying a vacuum to the forming elements"

Column 9, Claim 8, Line 33:
"the at least-two part hollow mold"
Should be:
"an at least two-part hollow mold"

Signed and Sealed this
Thirteenth Day of August, 2024

Katherine Kelly Vidal
*Director of the United States Patent and Trademark Office*